US012781797B2

(12) United States Patent
Ryu et al.

(10) Patent No.: US 12,781,797 B2
(45) Date of Patent: Nov. 3, 2026

(54) THRUST BEARING

(71) Applicant: Industry-University Cooperation Foundation Hanyang University Erica Campus, Ansan-si (KR)

(72) Inventors: Keun Ryu, Ansan-si (KR); Chae Yeon Baek, Ansan-si (KR)

(73) Assignee: Industry-University Cooperation Foundation Hanyang University Erica Campus, Ansan-si (KR)

( * ) Notice: Subject to any disclaimer, the term of this patent is extended or adjusted under 35 U.S.C. 154(b) by 16 days.

(21) Appl. No.: 18/974,834

(22) Filed: Dec. 10, 2024

(65) Prior Publication Data

US 2025/0215927 A1 Jul. 3, 2025

(30) Foreign Application Priority Data

Dec. 28, 2023 (KR) ........................ 10-2023-0195346
Jan. 26, 2024 (KR) ........................ 10-2024-0012473

(51) Int. Cl.

| | |
|---|---|
| ***F16C 33/10*** | (2006.01) |
| ***F16C 17/03*** | (2006.01) |
| ***F16C 17/06*** | (2006.01) |
| ***F16C 27/02*** | (2006.01) |
| ***F16C 32/06*** | (2006.01) |

(52) U.S. Cl.

CPC .......... *F16C 33/106* (2013.01); *F16C 17/065* (2013.01); *F16C 27/02* (2013.01); *F16C 32/0666* (2013.01); *F16C 32/0677* (2013.01); *F16C 33/1045* (2013.01)

(58) Field of Classification Search

CPC ........ F16C 17/06; F16C 17/065; F16C 27/02; F16C 33/1045; F16C 33/106; F16C 33/1085; F16C 32/0603; F16C 32/0614; F16C 32/0622; F16C 32/0629; F16C 32/0633; F16C 32/064; F16C 32/0651;
(Continued)

(56) References Cited

U.S. PATENT DOCUMENTS

2017/0298766 A1* 10/2017 Ertas ..................... F01D 25/164
2017/0321747 A1* 11/2017 Ertas ....................... F16C 17/26
(Continued)

FOREIGN PATENT DOCUMENTS

| | | | |
|---|---|---|---|
| JP | 2017194148 | A | 10/2017 |
| KR | 20100054253 | A | 5/2010 |
| KR | 20230009796 | A | 1/2023 |

*Primary Examiner* — Alan B Waits
(74) *Attorney, Agent, or Firm* — NKL Law; Jae Youn Kim

(57) ABSTRACT

Provided is a thrust bearing including: a bearing base ring-coupled to an outer diameter surface of a rotary shaft; a pad portion provided on the bearing base, in which bearing pads having a bearing surface facing a thrust disc provided outward and radially from the rotary shaft to axially support the thrust disc are circumferentially spaced apart in the bearing base; and an elastic support portion provided between the bearing base and the bearing pad to elastically support the bearing pad, wherein the elastic support portion includes first and second elastic bodies laterally symmetrical between the bearing base and the bearing pad so as to be longitudinally bent at least twice, in which longitudinal upper ends meet on a lower surface of the bearing pad to come into line contact with the bearing pad, and longitudinal lower ends are moved away and seated on the bearing base.

12 Claims, 15 Drawing Sheets

(58) Field of Classification Search
CPC .......................... F16C 32/0666; F16C 32/067; F16C 32/0677; F16C 32/0692; F16C 17/035
See application file for complete search history.

(56) References Cited

U.S. PATENT DOCUMENTS

| | | | | |
|---|---|---|---|---|
| 2019/0085832 | A1 | 3/2019 | Brencher et al. | |
| 2019/0120289 | A1 * | 4/2019 | Kim | F16C 33/107 |
| 2020/0191200 | A1 * | 6/2020 | Ertas | F16F 15/0237 |
| 2025/0314269 | A1 * | 10/2025 | Ryu | F16C 33/10 |

* cited by examiner

THRUST BEARING

BACKGROUND OF THE INVENTION

1. Field of the Invention

The present invention relates to a thrust bearing, and more specifically, to a thrust bearing having a high load bearing capacity and a damping capacity under static and dynamic load conditions, and an active responding ability to deformation and tilting of a thrust disc.

2. Description of the Related Art

Recently, as the demand for high-speed rotating machines operable in extreme operating environments has increased in industries related to energy, propulsion and motive power, the high-performance and high-efficiency fluid bearing technology has been spotlighted.

This is because bearings occupy a very large proportion in developing and operating high-speed and high-efficiency turbines, compressors, and pump systems.

Meanwhile, externally pressurized fluid thrust bearings according to the related art may have one orifice in a bearing pocket, and have no mechanism for providing structural damping force to the bearings.

In addition, the externally pressurized fluid thrust bearings according to related art may fail to actively cope with the deformation and tilting of the thrust disc.

SUMMARY OF THE INVENTION

The present invention provides a thrust bearing having a high load bearing capacity and a damping capacity under static and dynamic load conditions, and an active responding ability to deformation and tilting of a thrust disc.

The present invention further provides a thrust bearing for supplying a sufficient working fluid to a bearing surface.

The technical objects to be solved by the present invention are not limited to the above description.

In order to solve the above-mentioned technical objects, the present invention provides a thrust bearing.

According to one embodiment, the thrust bearing includes: a bearing base mounted in a ring-coupled manner to an outer diameter surface of a rotary shaft; a pad portion provided on the bearing base, in which a plurality of bearing pads having a bearing surface facing a thrust disc provided outward in a radial direction of the rotary shaft to support the thrust disc in an axial direction through the bearing surface are spaced apart from each other in a circumferential direction of the bearing base; and an elastic support portion provided between the bearing base and the bearing pad to elastically support the bearing pad, wherein the elastic support portion includes first and second elastic bodies symmetrical left and right between the bearing base and the bearing pad, and the first and second elastic bodies are bent at least twice in a longitudinal direction, in which longitudinal upper ends of the first and second elastic bodies are structured to meet each other on a lower surface of the bearing pad to come into line contact with the lower surface of the bearing pad, and longitudinal lower ends of the first and second elastic bodies are structured to be moved away from each other and seated on an upper surface of the bearing base.

According to one embodiment, each of the first and second elastic bodies may include: a first inclined part provided as a slope and having a longitudinal one end connected to the bearing pad; a first bending part extending from a longitudinal opposite end of the first inclined part, and provided as a curved surface bent toward a lower surface of the first inclined part; a second inclined part extending from longitudinal one end of the first bending part to face the lower surface of the first inclined part, and provided as a slope having a length shorter than a length of the first inclined part; a second bending part extending from longitudinal one end of the second inclined part, and provided as a curved surface bent toward a lower surface of the second inclined part; and a third inclined part having longitudinal one end connected to the bearing base and provided as a slope extending from longitudinal one end of the second bending part to face the lower surface of the second inclined part.

According to one embodiment, among the first inclined part, the second inclined part and the third inclined part, the thickness of the first inclined part may be the thinnest, and the thickness of the third inclined part may be the thickest.

According to one embodiment, a spaced distance between the first bending part and the third inclined part and a spaced distance between the second bending part and the first inclined part may be less than or equal to a spaced distance between the second inclined part and the first inclined part and a spaced distance between the second inclined part and the third inclined part, respectively.

According to one embodiment, the first inclined part and the second inclined part may form an acute angle about the first bending part as a center, and the second inclined part and the third inclined part may form an acute angle about the second bending part as a center.

According to one embodiment, the thrust bearing further includes a bearing web, wherein the bearing web is provided between the bearing base and the pad portion, positioned between the first elastic body and the second elastic body, and integrally formed with the bearing base, the pad portion and the elastic support portion, and has flexibility.

According to one embodiment, the bearing base may include: a base body having an axially open center to the rotary shaft is inserted; and a groove part provided on an upper surface of the base body to correspond to the bearing web, and further include a damper, in which the damper may be installed in the groove part to support the bearing pad axially through the bearing web.

According to one embodiment, the thrust bearing further includes a working fluid supply line, wherein the working fluid supply line may provide a moving path for a working fluid supplied to a rear side of the bearing base, sequentially passing through the bearing base, the elastic support portion and the bearing pad, and discharged at high pressure toward the thrust disc.

According to one embodiment, the working fluid supply line may include: a first supply line provided inside the bearing base; a second supply line connected to the first supply line, and provided inside the elastic support portion; and a third supply line connected to the second supply line, and provided inside the bearing pad.

According to one embodiment, the first supply line may include: a bearing groove formed circumferentially on a rear surface of the bearing base; and a base flow channel part connected to the bearing groove and including the first flow channel extending toward the first elastic body and the second flow channel extending toward the second elastic body, in which the first and second flow channels are paired to correspond to the elastic support portion.

According to one embodiment, the second supply line may include: a third flow channel connected to the first flow channel and formed inside the first elastic body to have a shape corresponding to the first elastic body; and a fourth flow channel connected to the second flow channel and formed inside the second elastic body to have a shape corresponding to the second elastic body.

According to one embodiment, the third supply line may include: A fifth flow channel connected to the second supply line and formed inside the bearing pad to have a shape traversed between inner and outer diameters of the bearing pad; a sixth flow channel connected to the fifth flow channel and extending in a surface direction of the bearing pad so as to form a grid structure symmetrical left and right with the fifth flow channel as a center; and a plurality of orifices connected to the sixth flow channel, and formed from corners of the grid structure toward the bearing surface of the bearing pad.

According to the embodiment of the present invention, the thrust bearing includes: a bearing base mounted in a ring-coupled manner to an outer diameter surface of a rotary shaft; a pad portion provided on the bearing base, and having a bearing surface facing a thrust disc provided outward in a radial direction of the rotary shaft, in which a plurality of bearing pads for supporting the thrust disc in an axial direction through the bearing surface are spaced apart from each other in a circumferential direction of the bearing base; and an elastic support portion provided between the bearing base and the bearing pad to elastically support the bearing pad, wherein the elastic support portion includes first and second elastic bodies symmetrical left and right between the bearing base and the bearing pad, and the first and second elastic bodies are bent at least twice in a longitudinal direction, in which longitudinal upper ends of the first and second elastic bodies are structured to meet each other on a lower surface of the bearing pad to come into line contact with the lower surface of the bearing pad, and longitudinal lower ends of the first and second elastic bodies are structured to be moved away from each other and seated on an upper surface of the bearing base.

Accordingly, the thrust bearing having a high load bearing capacity and a damping capacity under static and dynamic load conditions, and an active responding ability to deformation and tilting of a thrust disc can be provided.

In addition, according to the embodiment of the present invention, the thrust bearing is provided, so that a sufficient working fluid can be supplied to a bearing surface.

Further, according to the embodiment of the present invention, the thrust bearing is provided such that a bearing base, a bearing pad, a bearing web and an elastic support portion can be integrally formed through the metal 3D printing.

DETAILED DESCRIPTION OF THE INVENTION

Hereinafter, exemplary embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

Herein, when one component is mentioned as being on the other component, it signifies that the one component may be placed directly on the other component or a third component may be interposed therebetween. In addition, in drawings, shapes and sizes may be exaggerated to effectively describe the technical content of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, the term "unit", "device", "module", or an equivalent thereof signifies a unit for processing at least one function or operation, and may be implemented in hardware or software or a combination of hardware and software.

In addition, in the following description of the embodiments of the present invention, the detailed description of known functions and configurations incorporated herein will be omitted when it possibly makes the subject matter of the present invention unclear unnecessarily.

FIGS. 1 to 15 are views for explaining the thrust bearing according to one embodiment of the present invention.

Figure 1:
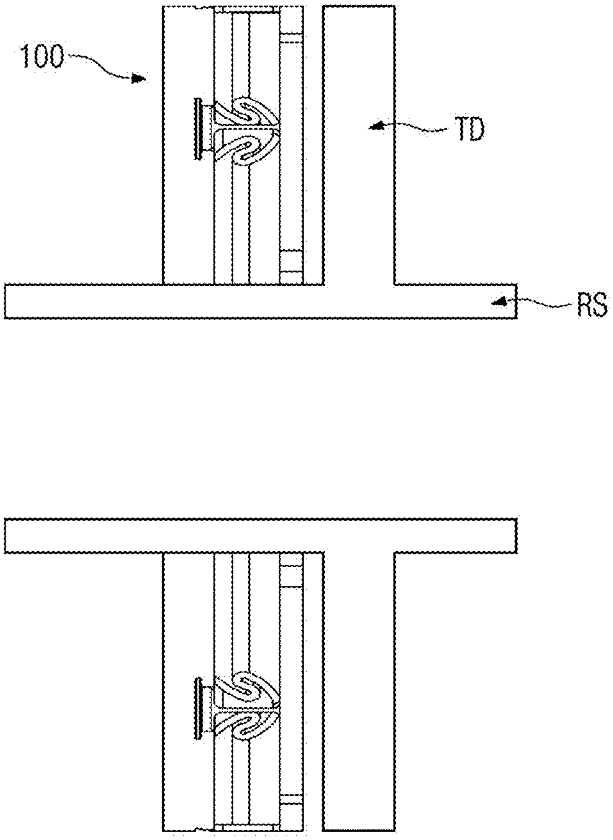
FIG. 1 is a view showing a state in which a thrust bearing according to one embodiment of the present invention is mounted onto a rotary shaft.

As shown in FIG. 1, a thrust bearing 100 according to one embodiment of the present invention refers to a bearing for supporting an axial load of a rotating machine, and may be installed on an outer diameter surface of a rotary shaft RS provided in the rotating machine, such as a turbine, a compressor or a pump. A thrust disc TD may be provided on the rotary shaft RS of the rotating machine on which the thrust bearing 100 according to one embodiment of the present invention is installed.

The thrust disc TD may be provided in a form that extends outward in a radial direction of the rotary shaft RS. In other words, the thrust disc TD may be provided in a shape of a disc having an open center. The thrust disc TD may be ring-coupled to the outer diameter surface of the rotary shaft RS.

The thrust bearing 100 according to one embodiment of the present invention and the thrust disc TD may be arranged opposite to each other in the axial direction of the rotary shaft RS.

Figure 2:
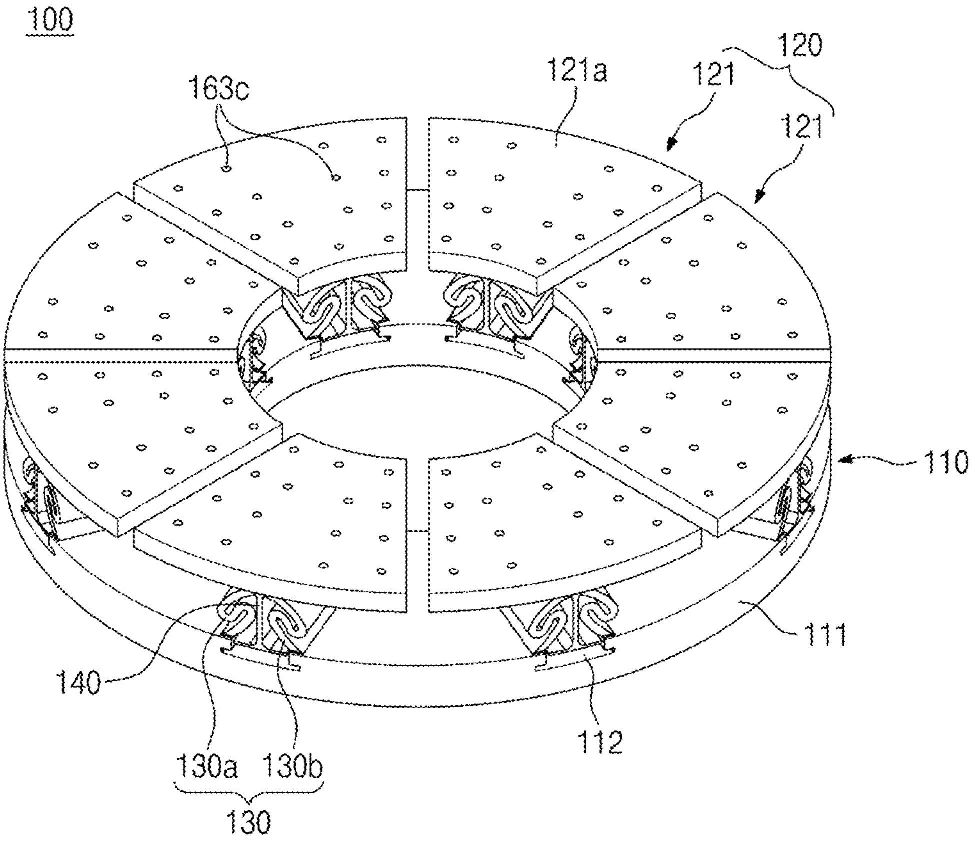
FIGS. 2 to 4 are views for explaining the thrust bearing according to one embodiment of the present invention.
Figure 3:
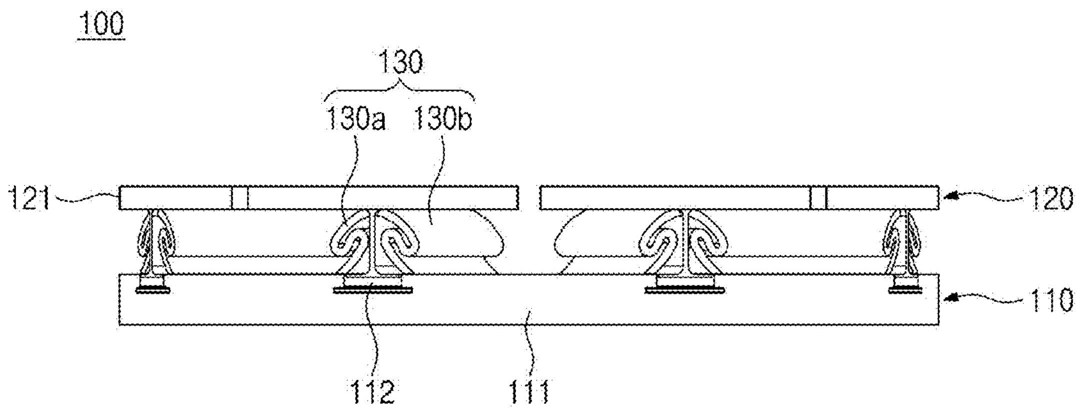
Figure 4:
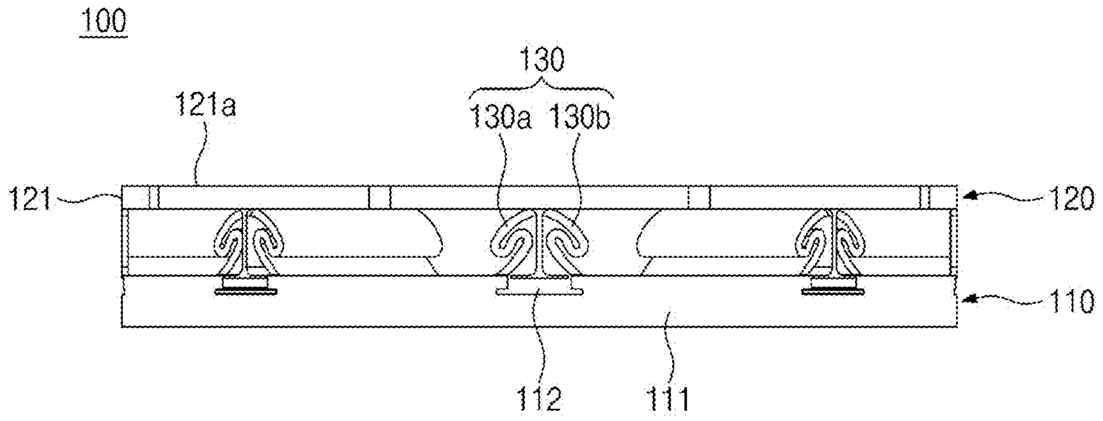

As shown in FIGS. 2 to 4, the thrust bearing 100 according to one embodiment of the present invention may include a bearing base 110, a pad portion 120 and an elastic support portion 130.

The bearing base 110 may be mounted in a form that is ring-coupled to the outer diameter surface of the rotary shaft RS. The bearing base 110 may be connected to a rear (lower side based on the drawings) of the pad portion 120 to support the pad portion 120. The bearing base 110 may be fixed to a bearing housing (not shown).

According to one embodiment of the present invention, the bearing base 110 may include a base body 111 and a groove part 112.

The base body 111 defines an appearance of the bearing base 110. The base body 111 may have a center opened in the axial direction so that the rotary shaft RS is inserted thereto. For example, the base body 111 may be provided in a thin ring shape.

The groove part 112 may be formed on an upper surface of the base body 111. The groove part 112 may be provided to correspond to individual bearing pads 121 forming the pad portion 120. More particularly, the groove part 112 may be formed on the upper surface of the base body 111 to correspond to the bearing web 140 described later.

For example, the groove part 112 may be provided on the upper surface of the base body 111 so as to be positioned below each bearing web 140 described later. In other words, according to one embodiment of the present invention, the groove part 112 may be provided in a number corresponding to the bearing webs 140 provided in one-to-one correspondence with the bearing pads 121.

Thus, according to one embodiment of the present invention, a plurality of groove parts 112 may be provided on the upper surface of the base body 111. The groove parts 112 may be provided in a circumferential direction on the upper surface of the base body 111 so as to correspond to the bearing webs 140 provided in one-to-one correspondence with the bearing pads 121.

According to one embodiment of the present invention, the groove part 112 may be provided in a depth direction from the upper surface of the base body 111. The groove part 112 provides an installation space for a damper 150 (in FIG. 5) described later, and this will be described below in more detail.

Next, referring to FIGS. 2 to 4, the pad portion 120 may be provided above the bearing base 110. When the thrust bearing 100 according to one embodiment of the present invention is mounted on the rotary shaft RS, the pad portion 120 may face a thrust disc TD provided on the rotary shaft RS.

According to one embodiment of the present invention, the pad portion 120 may be composed of a plurality of bearing pads 121 arranged to be spaced apart from each other in a circumferential direction of the bearing base 110. The bearing pads 121 forming the pad portion 120 may have the same shape and size.

In one embodiment of the present invention, eight bearing pads 121 arranged to be spaced apart from each other in the circumferential direction of the bearing base 110 are exemplified, however, this is only an example and the number of bearing pads 121 formed in the present invention is not specifically limited. In other words, the number of forming bearing pads 121 may be variously adjusted depending on design, performance, and operating conditions and environments of the bearing.

The bearing pad 121 may be provided above the groove 112 formed on the upper surface of the bearing base 110. According to one embodiment of the present invention, the bearing pad 121 may be supported by the elastic support portion 130 and spaced apart from the bearing base 110 through the elastic support portion 130.

According to one embodiment of the present invention, the bearing pad 121 may have a bearing surface **121*a* to face the thrust disc TD provided outward in the radial direction of the rotary shaft RS. The bearing pad 121 may support the thrust disc TD in the axial direction through the bearing surface 121*a***.

According to one embodiment of the present invention, the bearing pad 121 may be formed in a sector shape having an outer diameter side relatively wider than an inner diameter side thereof.

The outer diameter side of the bearing pad 121 may have the same curvature as an outer diameter of the bearing base 110, and the inner diameter side of the bearing pad 121 may have the same curvature as an inner diameter of the bearing base 110.

In addition, the shortest distance from the outer diameter side to the inner diameter side of the bearing pad 121 may be the same as the shortest distance from the outer diameter to the inner diameter of the bearing base 110. Accordingly, an outer diameter of the ring defined by the bearing pads 121 arranged in the circumferential direction on the bearing base 110 may be the same as the outer diameter of the bearing base 110. An inner diameter of the ring defined by the bearing pads 121 may be the same as the inner diameter of the bearing base 110.

Meanwhile, according to one embodiment of the present invention, a plurality of discharge ports of orifices **163*c* for discharging the working fluid at high pressure toward the thrust disc TD may be exposed on the bearing surface 121*a* of the bearing pad 121**.

The orifices **163*c* may enhance the load bearing capacity of the thrust bearing 100 and also improve a cooling function of the thrust bearing 100, thereby serving to increase durability and reliability of the thrust bearing 100**, and this will be described below in more detail.

Next, referring to FIGS. 2 to 4, the elastic support portion 130 may be provided between the bearing base 110 and the bearing pad 121. The elastic support portion 130 may be provided to correspond to each of the bearing pads 121.

According to one embodiment of the present invention, the elastic support portion 130 may elastically support the bearing pad 121. The bearing pad 121 may be freely tilted by the elastic support portion 130, and when an axial load is applied, the elastic support portion 130 may deforms in the axial direction, so that the axial load bearing capacity of the thrust bearing 100 may be significantly improved under extreme conditions.

According to one embodiment of the present invention, the elastic support portion 130 may include a first elastic body 130*a* and a second elastic body 130*b*.

The first elastic body 130*a* and the second elastic body 130*b* may be provided to have a left-right symmetrical shape between the bearing base 110 and the bearing pad 121.

According to one embodiment of the present invention, the first elastic body 130*a* and the second elastic body 130*b* may be provided to be folded at least twice in a longitudinal direction. For example, each of the first elastic body 130*a* and the second elastic body 130*b* may be provided as a structure having a section with an 'S' shape.

Upper ends of the first elastic body 130*a* and the second elastic body 130*b* in the longitudinal direction may be structured to meet each other at a lower surface of the bearing pad 121 to come into line contact with the lower surface of the bearing pad 121.

Accordingly, the upper ends of the first elastic body 130*a* and the second elastic body 130*b* in the longitudinal direction are structured to meet each other at the lower surface of the bearing pad 121 to come into line contact with the lower surface of the bearing pad 121, so that the contact area between the elastic support portion 130 and the bearing pad 121 may be minimized, and accordingly, the bearing pad 121 elastically supported by the elastic support portion 130 may be freely tilted.

Lower ends of the first elastic body 130*a* and the second elastic body 130*b* in the longitudinal direction may be structured to be moved away from each other and seated on the upper surface of the bearing base 110. Accordingly, the elastic support portion 130 composed of the first elastic body 130*a* and the second elastic body 130*b* may stably support the tilting bearing pad 121.

Figure 5:
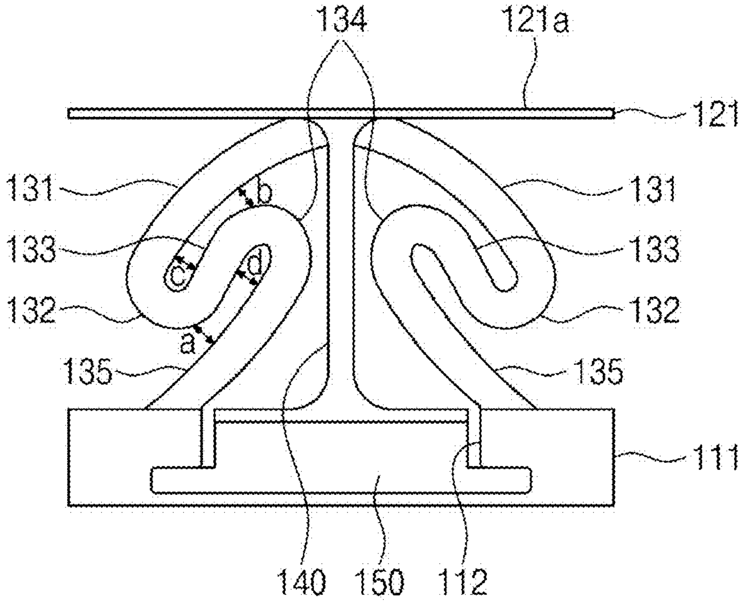
FIG. 5 is a view for explaining an elastic support portion of the thrust bearing according to one embodiment of the present invention.
Figure 6:
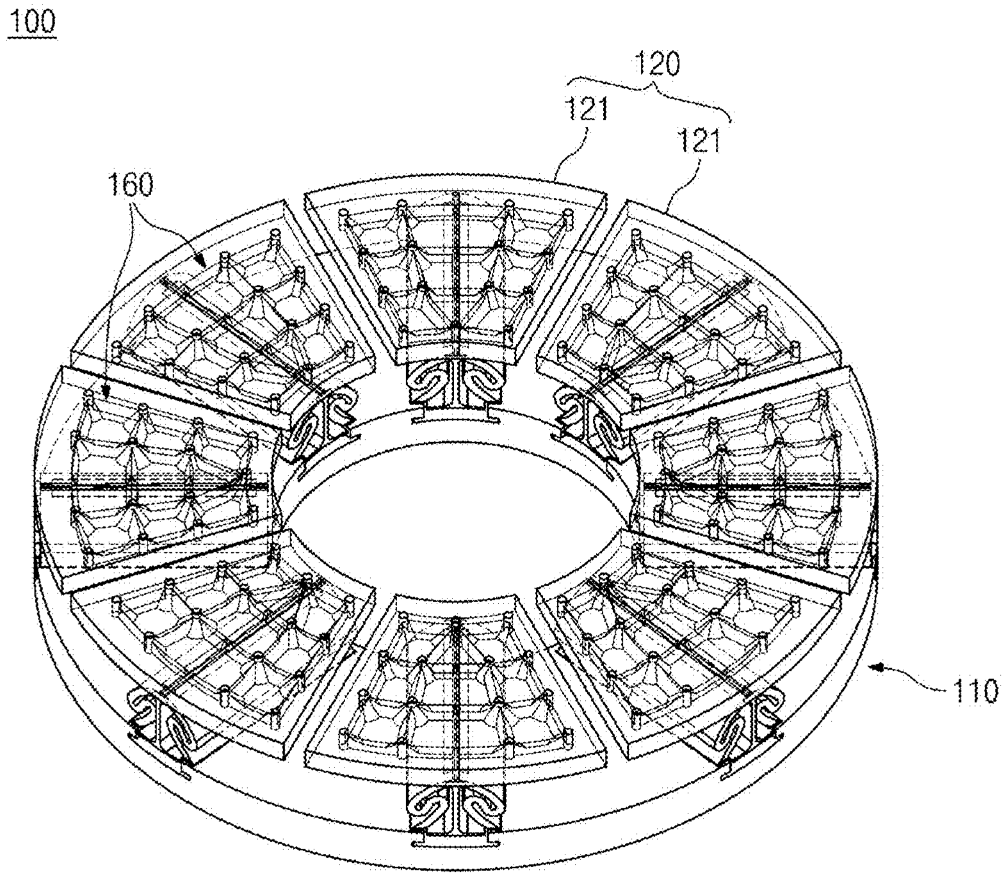
FIGS. 6 to 9 are views for explaining a working fluid supply line of the thrust bearing according to one embodiment of the present invention.
Figure 7:
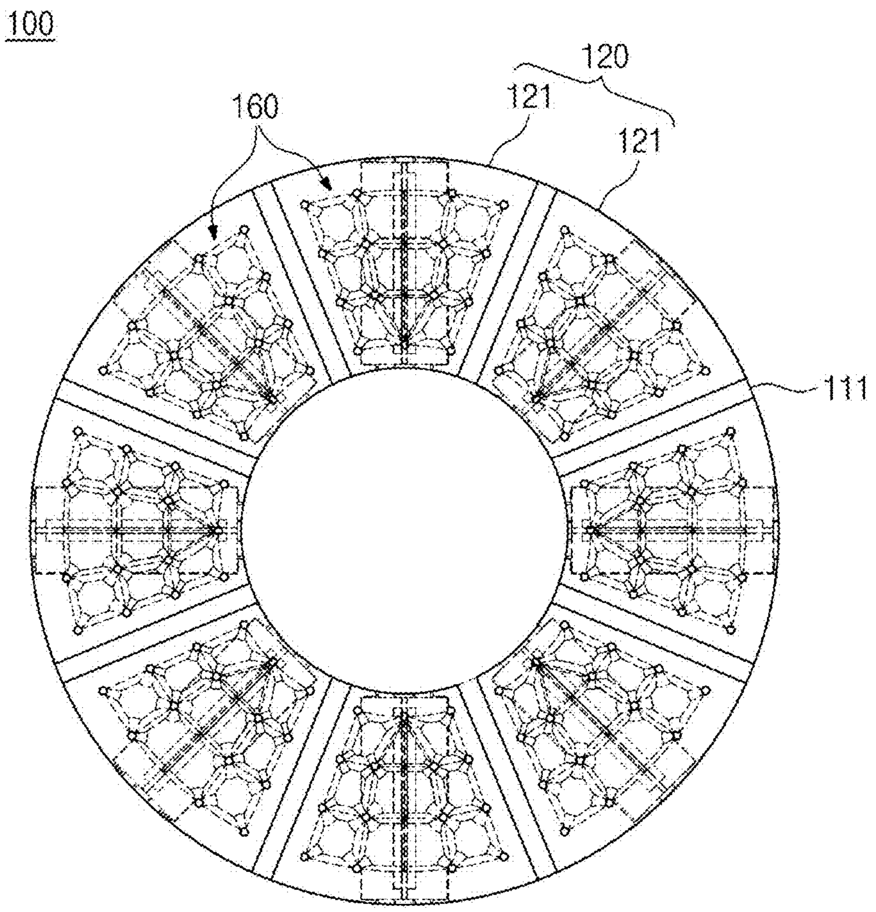
Figure 8:
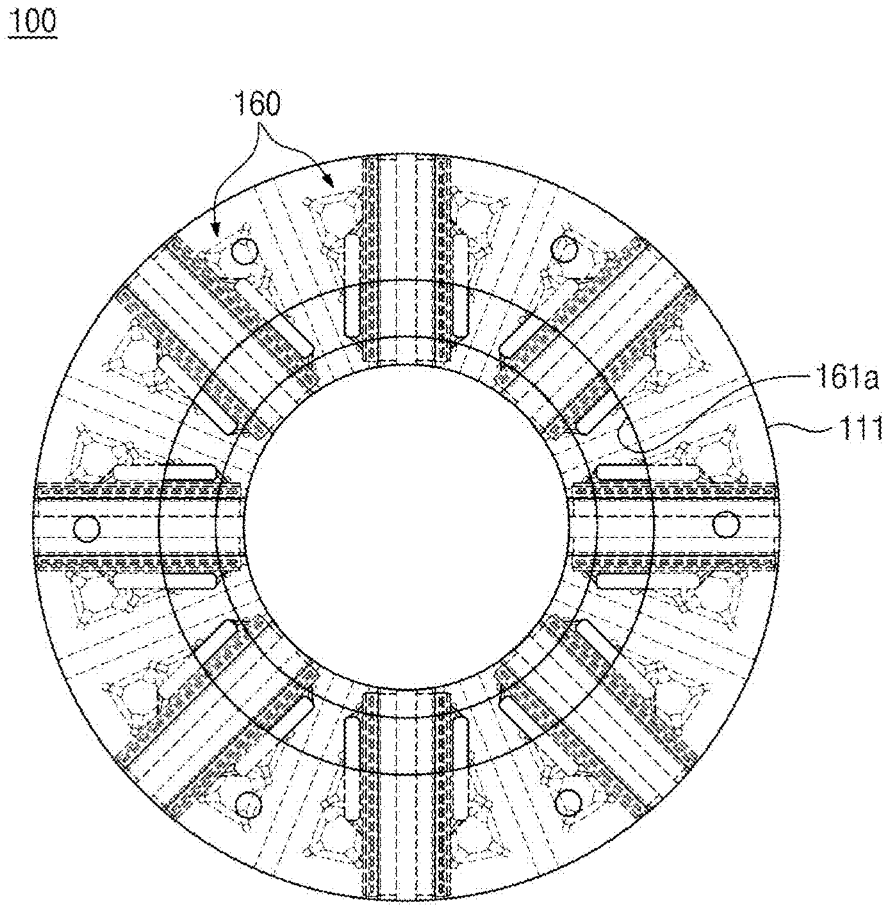
Figure 9:
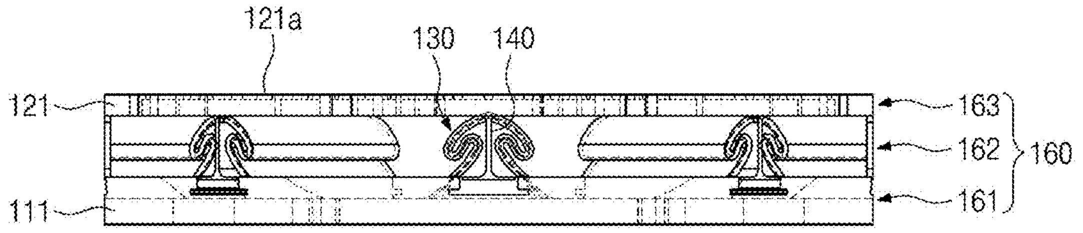

As shown in FIG. 5, according to one embodiment of the present invention, each of the first elastic body 130*a* and the second elastic body 130*b* may include a first inclined part 131, a first bending part 132, a second inclined part 133, a second bending part 134 and a third inclined part 135.

The first inclined part 131 may be provided as a plate shape. One longitudinal end of the first inclined part 131 may be connected to the bearing pad 121. The first inclined part 131 may be provided as a slope inclined downward from a lower surface of the bearing pad 121.

The first bending part 132 may be provided at an opposite end in the longitudinal direction of the first inclined part 131. The first bending part 132 may extend from the opposite end in the longitudinal direction of the first inclined part 131. At this point, the first bending part 132 may be provided as a curved surface bent toward a lower surface of the first inclined part 131.

The second inclined part 133 may be provided at one end in the longitudinal direction of the first bending part 132. The second inclined part 133 may extend from the one end in the longitudinal direction of the first bending part 132. The second inclined part 133 may extend from the one end in the longitudinal direction of the first bending part 132 to face the lower surface of the first inclined part 131. Accordingly, the first inclined part 131, the first bending part 132 and the second inclined part 133 may approximately form a rectangular 'C' shape.

According to one embodiment of the present invention, the second inclined part 133 may be provided as a slope having a length shorter than the first inclined part 131.

The second bending part 134 may be provided at one end in the longitudinal direction of the second inclined part 133. The second bending part 134 may extend from the one end in the longitudinal direction of the second inclined part 133. At this point, the second bending part 134 may be provided as a curved surface bent toward a lower surface of the second inclined part 133.

The third inclined part 135 may be provided at one end in the longitudinal direction of the second bending part 134. The third inclined part 135 may extend from the one end in the longitudinal direction of the second bending part 134. The third inclined part 135 may extend from the one end in the longitudinal direction of the second bending part 134 to face the lower surface of the second inclined part 133. Accordingly, the second inclined part 133, the second bending part 134 and the third inclined part 135 may approximately form a rectangular 'C' shape.

According to one embodiment of the present invention, the third inclined part 135 may be provided as a slope and have one end in the longitudinal direction connected to the bearing base 110. The third inclined part 135 of the first elastic body 130*a* and the third inclined part 135 of the second elastic body 130*b* may be moved away from each other and connected to one side and the other side on the upper surface of the bearing base 110.

The one side and the other side on the upper surface of the bearing base 110 may be both sides of the groove part 112.

Meanwhile, according to one embodiment of the present invention, the first inclined part 131 coming into contact with the bearing pad 121 may be provided with a thin thickness. Accordingly, the first inclined part 131 may be easily deformed, so that the bearing pad 121 may be freely tilted for various loads.

Whereas, the third inclined part 135 coming into contact with the bearing base 110 may be provided with a thick thickness. Accordingly, the tilting of the bearing pad 121 and the axial deformation of the first inclined part 131, the first bending part 132, the second inclined part 133 and the second bending part 134 may be stably supported.

In other words, according to one embodiment of the present invention, among the first inclined part 131, the second inclined part 133 and the third inclined part 135, the first inclined part 131 forming the upper end of the elastic support portion 130 and coming into contact with the bearing pad 121 may have the thinnest thickness, and the third inclined part 135 forming the lower end of the elastic support portion 130 and coming into contact with the bearing base 110 may have the thickest thickness.

According to one embodiment of the present invention, a spaced distance a between the first bending part 132 and the third inclined part 135 may be less than or equal to a spaced distance d between the second inclined part 133 and the third inclined part 135. In other words, a spaced distance a between the first bending part 132 and the third inclined part 135 may be equal to the spaced distance d between the second inclined part 133 and the third inclined part 135, or less than the spaced distance d between the second inclined part 133 and the third inclined part 135.

In addition, a spaced distance b between the second bending part 134 and the first inclined part 131 may be less than or equal to a spaced distance c between the second inclined part 133 and the first inclined part 131. In other words, a spaced distance b between the second bending part 134 and the first inclined part 131 may equal to the spaced distance c between the second inclined part 133 and the first inclined part 131, or less than the spaced distance c between the second inclined part 133 and the first inclined part 131.

In another aspect, the first inclined part 131 and the second inclined part 133 forming the approximately rectangular 'C' shape may form an acute angle around the first bending part 132.

In addition, the second inclined part 133 and the third inclined part 135 forming the approximately rectangular 'C' shape may form an acute angle around the second bending part 134.

In other words, the first inclined part 131 and the second inclined part 133, and the second inclined part 133 and the third inclined part 135 may have minimized separated gaps, respectively. In other words, the first inclined part 131 and the second inclined part 133, and the second inclined part 133 and the third inclined part 135 may have the same or similar gradients.

Accordingly, the first elastic body 130*a* and the second elastic body 130*b* may be each compressed in a vertical direction and provided in an approximate 'S' shape tilted by a set angle from the normal direction of the bearing pad 121, and may be symmetrical to each other left and right between the bearing base 110 and the bearing pad 121.

The elastic support portion 130 composed of the first elastic body 130*a* and the second elastic body 130*b* may actively respond to deformation and tilting of the thrust disc TD while deforming according to the size of the load under various static and dynamic load conditions.

Meanwhile, the thrust bearing 100 according to one embodiment of the present invention may further include a bearing web 140.

The bearing web 140 may be provided between the bearing base 110 and the pad portion 120. The bearing web 140 may be provided to correspond to each of the bearing pads 121.

According to one embodiment of the present invention, the bearing web 140 may be provided to correspond to the elastic support portion 130. The bearing web 140 may be positioned between the first elastic body 130*a* and the second elastic body 130*b*.

The bearing web 140 may separate the bearing pad 121 from the bearing base 110 together with the elastic support portion 130, and support the bearing pad 121 above the bearing base 110.

According to one embodiment of the present invention, the bearing web 140 may be provided in the form of a beam having flexibility. For example, the bearing web 140 may have a width narrower than the bearing pad 121, and be provided to be traversed between the outer diameter and inner diameter of the bearing base 110.

An upper end of the bearing web 140 may be connected to the lower surface of the bearing pad 121 so as to come into line contact with the lower surface of the bearing pad 121 together with the first inclined parts 131 of the first elastic body 130*a* and the second elastic body 130*b*.

The bearing web 140 may be provided, together with the elastic support portion 130, radially in the circumferential direction of the bearing base 110 with respect to a center of the bearing base 110.

Accordingly, when the bearing pad 121 is supported by the flexible beam-shaped bearing web 140 and the elastic support portion 130, the bearing pad 121 may be actively moved according to the bearing operating conditions, that is, changes in static or dynamic load and tilt and expansion of the thrust disc TD.

Thus, the load bearing capacity of the thrust bearing 100 according to one embodiment of the present invention can be improved, and reliable performance can be maintained even under extreme operating conditions.

According to one embodiment of the present invention, the elastic support portion 130 composed of the first elastic body 130*a* and the second elastic body 130*b*, the bearing web 140, and the bearing base 110 and the bearing pad 121 connected to the upper and lower ends of the bearing web 140 may be integrally formed through metal 3D printing. In other words, the thrust bearing 100 according to one embodiment of the present invention may be manufactured, through the metal 3D printing, in an integral form including the bearing base 110, the pad portion 120 composed of the bearing pads 121, the elastic support portion 130 composed of the first elastic body 130*a* and the second elastic body 130*b*, and the bearing web 140.

Meanwhile, the thrust bearing 100 according to one embodiment of the present invention may further include a damper 150.

The damper 150 may be installed in the groove part 112 formed to correspond to the bearing web 140 on the upper surface of the base body 111. Thus, according to one embodiment of the present invention, a plurality of dampers 150 may be provided, and the dampers 150 may be correspondingly positioned below the bearing webs 140, respectively, so as to axially support the bearing pads 121 through the bearing webs 140.

Accordingly, each of the bearing pads 121 may be moved freely in the axial direction according to the axial load by using the damper 150 positioned therebelow. This may ensure the minimum oil film thickness for lubrication of the thrust bearing 100 even under extreme operating conditions, so that maximum performance of the thrust bearing 100 according to one embodiment of the present invention may be improved.

Meanwhile, the damper 150 according to one embodiment of the present invention may be provided as a bump shape. The bump-shaped damper 150 may serve to support the bearing pad 121 due to the axial load, and provide a damping force by a frictional force generated during deformation of the bump. Accordingly, the bump-shaped damper 150 may allow the thrust bearing 100 to have a high rigidity and damping force.

Accordingly, the damping force additionally provided by the bump-shaped damper 150 may ensure stability of a rotating system in operating environments generated with large dynamic loads in the axial direction of the rotary shaft RS, and prevent the thrust bearing 100 from being damaged.

According to one embodiment of the present invention, the rigidity and the damping force of the thrust bearing 100 may be tuned by changing the design of the bump shape of the damper 150, such as height, spacing and thickness of the bump.

Referring to FIGS. 6 to 9, the thrust bearing 100 according to one embodiment of the present invention may further include a working fluid supply line 160.

The working fluid supply line 160 may provide a moving path for a working fluid supplied to a rear side of the bearing base 110, sequentially passing through the bearing base 110, the elastic support portion 130 and the bearing pad 121, and discharged at high pressure toward the thrust disc TD. Oil, air or the like may be used as the working fluid.

According to one embodiment of the present invention, the working fluid supply line 160 may include a first supply line 161, a second supply line 162 and a third supply line 163.

The first supply line 161 may be defined as one side of the working fluid supply line 160 and provided inside the bearing base 110.

Figure 10:
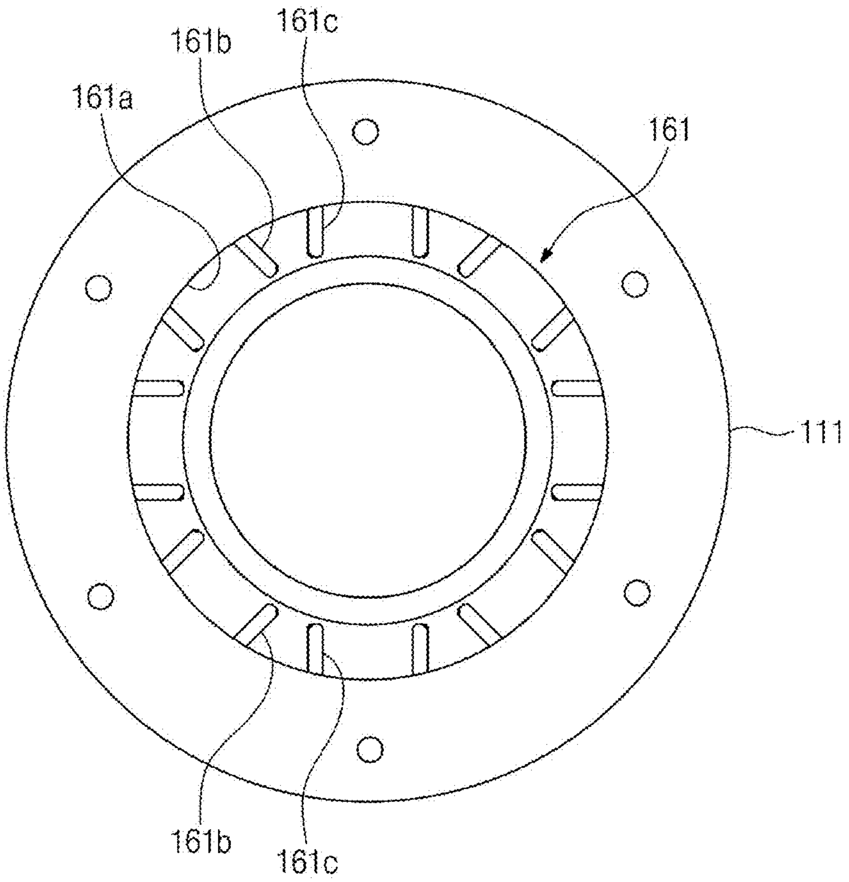
FIG. 10 is a view for explaining a first supply line of the working fluid supply line in the thrust bearing according to one embodiment of the present invention.
Figure 11:
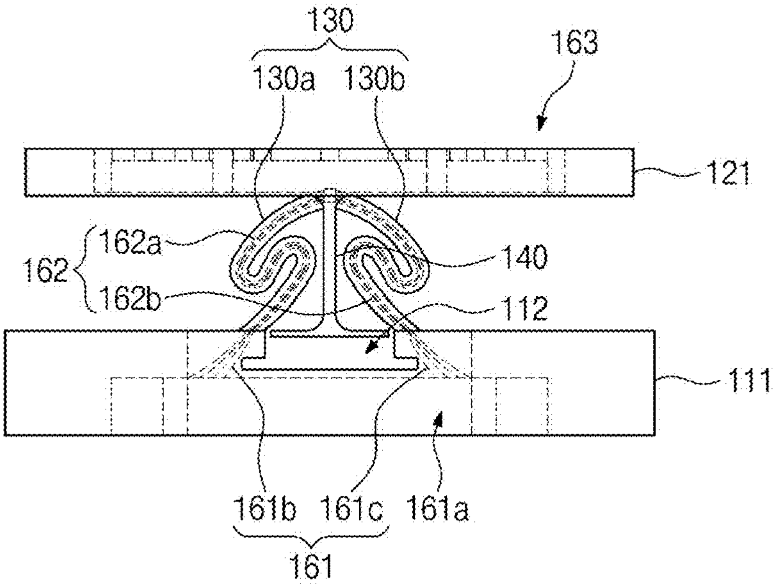
FIG. 11 is a view for explaining a first supply line and a second supply line of the working fluid supply line in the thrust bearing according to one embodiment of the present invention.

As shown in FIGS. 10 and 11, according to one embodiment of the present invention, the first supply line 161 may include a bearing groove 161*a* and a base flow channel part.

The bearing groove 161*a* may be provided on the bearing base 110, more specifically, on a rear surface of the base body 111 of the bearing base 110. The bearing groove 161*a* may be formed in the circumferential direction on the rear surface of the base body 111. For example, the bearing groove 161*a* may be formed in a ring shape on the rear surface of the base body 111. The bearing groove 161*a* may be formed in a depth direction from the rear surface of the base body 111.

According to one embodiment of the present invention, the working fluid may be introduced initially into the bearing groove 161*a*.

The base flow channel part may be connected to the bearing groove 161*a*. The base flow channel part may be paired to correspond to each elastic support portion 130. According to one embodiment of the present invention, the base flow channel part may include a first flow channel 161*b* and a second flow channel 161*c*.

The first flow channel 161*b* may be formed inside the base body 111. The first flow channel 161*b* may extend toward the first elastic body 130*a*. In other words, the first flow channel 161*b* may be formed in a direction toward the first elastic body 130*a*.

In addition, the second flow channel 161*c* may be formed inside the base body 111. The second flow channel 161*c* may extend toward the second elastic body 130*b*. In other words, the second flow channel 161*c* may be formed in a direction toward the second elastic body 130*b*.

The first flow channel 161*b* extending toward the first elastic body 130*a* and the second flow channel 161*c* extending toward the second elastic body 130*b* may form a symmetrical structure with the groove part 112 therebetween.

In other words, a plurality of paired first flow channel 161*b* and second flow channel 161*c* may be formed in the circumferential direction of the bearing groove 161*a*. In other words, the paired first and second flow channels 161*b* and 161*c* may be provided in one-to-one correspondence with the elastic support portion 130 in the circumferential direction of the bearing groove 161*a*.

According to one embodiment of the present invention, some of the working fluid introduced into the bearing groove 161*a* may flow into the first flow channel 161*b*, and the remainder may flow into the second flow channel 161*c*.

The second supply line 162 may be provided inside the elastic support portion 130. A longitudinal lower end of the second supply line 162 may be connected to the first supply line 161, and a longitudinal upper end of the second supply line 162 may be connected to the third supply line 163.

Figure 12:
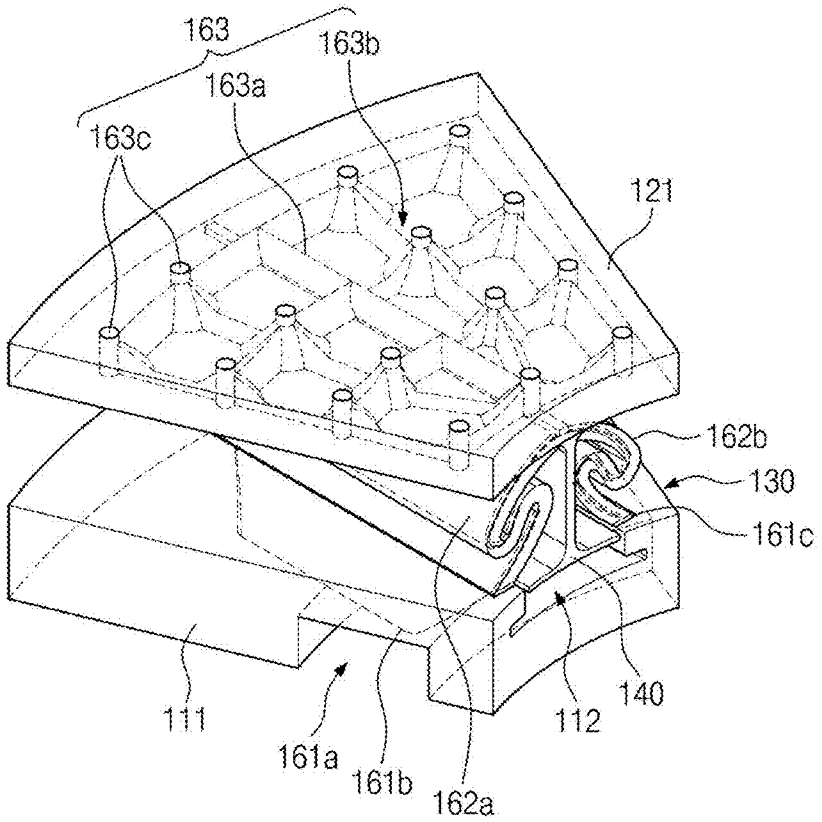
FIGS. 12 to 14 are views for explaining a second supply line and a third supply line of the working fluid supply line in the thrust bearing according to one embodiment of the present invention.

As shown in FIGS. 11 and 12, according to one embodiment of the present invention, the second supply line 162 may include a third flow channel 162*a* and a fourth flow channel 162*b*.

The third flow channel 162*a* may be connected to the first flow channel 161*b* of the first supply line 161. The third flow channel 162*a* may be formed inside the first elastic body 130*a*. The third flow channel 162*a* may be formed in a shape corresponding to the first elastic body 130*a*. For example, the third flow channel 162*a* may be formed to have a section of an approximate 'S' shape compressed and tilted to correspond to the shape of the first elastic body 130*a*.

The some of the working fluid introduced into the bearing groove 161*a* and passing through the first flow channel 161*b* may flow into the third flow channel 162*a*.

In addition, the fourth flow channel 162*b* may be connected to the second flow channel 161*c* of the first supply line 161. The fourth flow channel 162*b* may be formed inside the second elastic body 130*b*. The fourth flow channel 162*b* may be formed in a shape corresponding to the second elastic body 130*b*. For example, the fourth flow channel 162*b* may be formed to have a section of an approximate 'S' shape compressed and tilted to correspond to the shape of the second elastic body 130*b*.

Accordingly, the third flow channel 162*a* and the fourth flow channel 162*b* may form a left-right symmetrical structure like the first elastic body 130*a* and the second elastic body 130*b*.

The working fluid introduced into the bearing groove 161*a* and passing through the second flow channel 161*c* may flow into the fourth flow channel 162*b*.

The third supply line 163 may be defined as the other side of the working fluid supply line 160 and provided inside the bearing pad 121.

Figure 13:
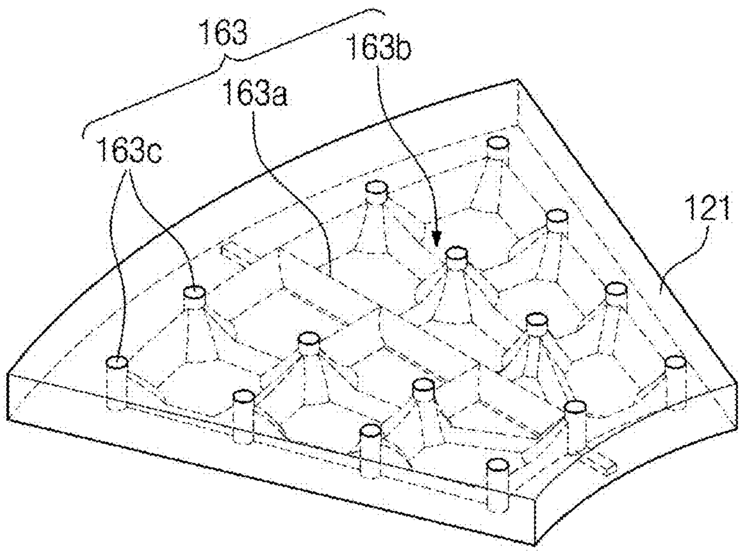
Figure 14:
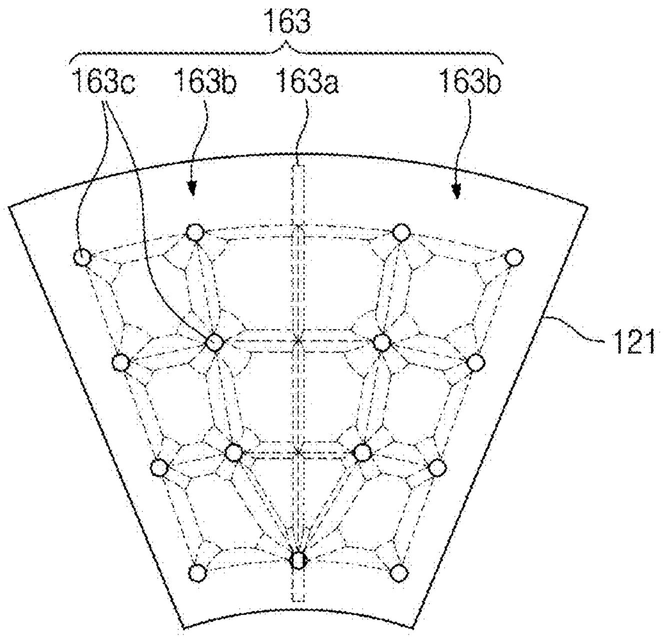

As shown in FIGS. 13 and 14, according to one embodiment of the present invention, the third supply line 163 may be connected to the second supply line 162. The third supply line 163 may include a fifth flow channel 163*a*, a sixth flow channel 163*b* and an orifice 163*c*.

The fifth flow channel 163*a* may be formed inside the bearing pad 121. The fifth flow channel 163*a* may be formed inside the bearing pad 121 in a shape traversed between the inner diameter and outer diameter of the bearing pad 121.

According to one embodiment of the present invention, the fifth flow channel 163*a* may be connected to the third flow channel 162*a* and the fourth flow channel 162*b* of the second supply line 162. Accordingly, the working fluid moved through the first flow channel 161*b* of the first supply line 161 and the third flow channel 162*a* of the second supply line 162, and the working fluid moved through the second flow channel 161*c* of the first supply line 161 and the fourth flow channel 162*b* of the second supply line 162 may be joined in the fifth flow channel 163*a*.

The sixth flow channel 163*b* may be formed inside the bearing pad 121. The sixth flow channel 163*b* may be connected to the fifth flow channel 163*a*. According to one embodiment of the present invention, the sixth flow channel 163*b* may extend in a surface direction of the bearing pad 121 while forming a grid structure symmetrical left and right with the fifth flow channel 163*a* as a center.

Accordingly, the working fluid flowing into the fifth flow channel 163*a* may flow into the sixth flow channel 163*b* forming the grid structure centered around the fifth flow channel 163*a*, so as to spread over the entire bearing surface 121*a* of the bearing pad 121.

The orifice 163*c* may be formed on the bearing surface 121*a* defined as the upper surface of the bearing pad 121 and facing the thrust disc TD. Accordingly, a discharge port of the orifice 163*c* may be exposed on the bearing surface 121*a*. The orifice 163*c* may be connected to the sixth flow channel 163*b*.

According to one embodiment of the present invention, a plurality of orifices 163*c* may be arranged in a longitudinal direction of the sixth flow channel 163*b*.

In other words, the orifices 163*c* may be arranged at corners, respectively, of the grid structure formed while extending in the surface direction of the bearing pad 121 in the sixth flow channel 163*c*. The orifices 163*c* may be formed from the corners of the grid structure toward the bearing surface 121*a* of the bearing pad 121.

Accordingly, the orifice 163*c* may be provided in multiple numbers, and the discharge ports of the orifices 163*c* may be arranged in a form distributed over the entire bearing surface 121*a*, for example, in a grid form.

The orifices 163*c* may be provided as a thin tube shape extending upward. Accordingly, when the orifices 163*c* are formed through the 3D printing, the orifices 163*c* may collapse. In order to prevent the orifices 163*c* from collapsing, the orifices 163 may be formed, during the 3D printing, by laminating metal to have a mountain-like shape at the corners of the grid structure formed therein with the orifices 163*c*.

Figure 15:
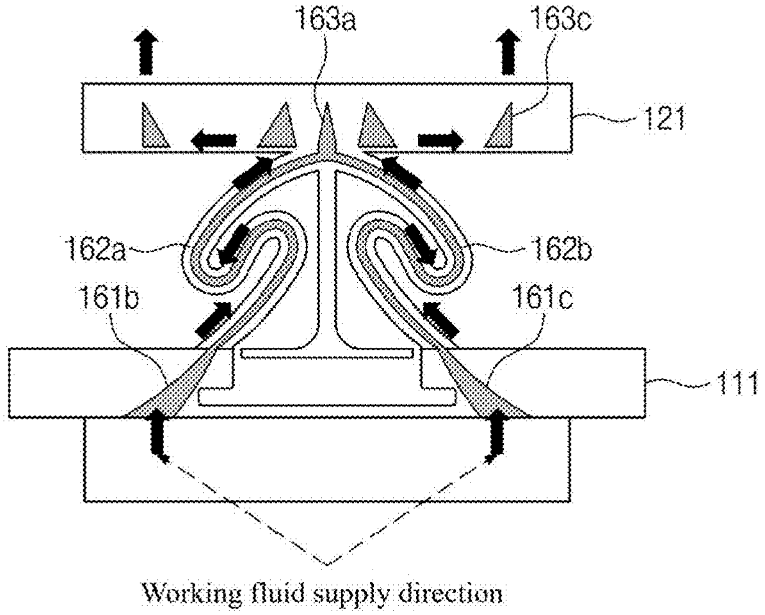
FIG. 15 is a view for explaining a process of supplying the working fluid to a bearing surface through the working fluid supply line of the thrust bearing according to one embodiment of the present invention.

Referring to FIG. 15, the working fluid may be introduced into the bearing groove 161*a* of the first supply line 161. Thereafter, some of the working fluid may flow into the first flow channel 161*b* extending toward the first elastic body 130*a*, and the remainder may flow into the second flow channel 161*c* extending toward the second elastic body 130*b*.

The working fluid flowing into the first flow channel 161*b* may flow into the third flow channel 162*a* of the second supply line 162 formed inside the first elastic body 130*a*. In addition, the working fluid flowing into the second flow channel 161*c* may flow into the fourth flow channel 162*b* of the second supply line 162 formed inside the second elastic body 130*b*.

Accordingly, the working fluids passing through the different supply paths may be joined in the fifth flow channel 163*a* of the third supply line 163 formed inside the bearing pad 121.

The working fluid joined in the fifth flow channel 163*a* may flow into the sixth flow channel 163*b* connected to the fifth flow channel 163*a* and spread over the entire surface direction of the bearing pad 121, and then may flow into the orifices 163*c* connected to the corners of the grid structure formed by the sixth flow channel 163*b* and be injected at high pressure toward the thrust disc TD.

According to one embodiment of the present invention, the working fluid is injected at the high pressure from the orifices 163*c* toward the thrust disc TD, so that the load bearing capacity of the thrust bearing 100 can be improved, and the cooling function of the thrust bearing 100 can also be improved. Accordingly, durability and reliability of the thrust bearing 100 according to one embodiment of the present invention can be improved.

As described above, the large-capacity working fluid supply line 160 capable of moving a large amount of working fluid inside the thrust bearing 100 according to one embodiment of the present invention at once is provided, thereby minimizing a pressure loss due to movements of the working fluid, so that the working fluid can be sufficiently supplied to the bearing surface 121*a*.

Although the present invention has been described in detail by using exemplary embodiments, the scope of the present invention is not limited to the specific embodiments, and will be interpreted by the appended claims. In addition, it will be apparent that a person having ordinary skill in the art may carry out various deformations and modifications for the embodiments described as above within the scope without departing from the present invention.

The invention claimed is:

1. A thrust bearing comprising:

a bearing base mounted in a ring-coupled manner to an outer diameter surface of a rotary shaft;

a pad portion provided on the bearing base and including a plurality of bearing pads, wherein the plurality of bearing pads is spaced apart from each other in a circumferential direction of the bearing base and each of the plurality of bearing pads has a bearing surface facing a thrust disc provided outward in a radial direction of the rotary shaft to support the thrust disc in an axial direction through the bearing surface; and a plurality of elastic support portions, each provided between the bearing base and a respective bearing pad of the plurality of bearing pads to elastically support the respective bearing pad, wherein each of the plurality of elastic support portions includes first and second elastic bodies symmetrically disposed relative to each other in the circumferential direction, wherein the first and second elastic bodies are bent at least twice in a longitudinal direction, and longitudinal upper ends of the first and second elastic bodies meet each other on a lower surface of the respective bearing pad to come into line contact with the lower surface, and longitudinal lower ends of the first and second elastic bodies are structured to be moved away from each other and seated on an upper surface of the bearing base.

2. The thrust bearing of claim 1, wherein each of the first and second elastic bodies includes:

a first inclined part including a slope and a longitudinal end connected to the respective bearing pad;

a first bending part extending from a longitudinal opposite end of the first inclined part, and including a curved surface bent toward a lower surface of the first inclined part;

a second inclined part extending from a longitudinal end of the first bending part to face the lower surface of the first inclined part, and including a slope having a length shorter than a length of the first inclined part;

a second bending part extending from a longitudinal end of the second inclined part, and including a curved surface bent toward a lower surface of the second inclined part; and a third inclined part having a longitudinal end connected to the bearing base, and including a slope extending from the longitudinal end of the second bending part to face the lower surface of the second inclined part.

3. The thrust bearing of claim 2, wherein, among the first inclined part, the second inclined part and the third inclined part, the first inclined part has a thinnest thickness, and the third inclined part has a thickest thickness.

4. The thrust bearing of claim 2, wherein a spaced distance between the first bending part and the third inclined part and a spaced distance between the second bending part and the first inclined part are less than or equal to a spaced distance between the second inclined part and the first inclined part and a spaced distance between the second inclined part and the third inclined part.

5. The thrust bearing of claim 2, wherein the first inclined part and the second inclined part form a first acute angle at the first bending part, and the second inclined part and the third inclined part form a second acute angle at the second bending part.

6. The thrust bearing of claim 1, further comprising:

a plurality of bearing webs, wherein each of the plurality of bearing webs is provided between the bearing base and the pad portion, positioned between the first elastic body and the second elastic body, and integrally formed with the bearing base, the pad portion and a respective elastic support portion of the plurality of elastic support portions, and each of the plurality of bearing webs is configured to elastically deform to allow axial movement and tilting of the respective bearing pad.

7. The thrust bearing of claim 6, wherein the bearing base includes:

a base body having a center open in an axial direction to allow insertion of the rotary shaft; and a groove part provided on an upper surface of the base body such that a respective bearing web of the plurality of bearing webs is seated in the groove part, and further includes:

a damper installed in the groove part to axially support each of the plurality of bearing pads through the respective bearing web of the plurality of bearing webs.

8. The thrust bearing of claim 1, further comprising:

a working fluid supply line, wherein the working fluid supply line provides a moving path of a working fluid supplied to a rear side of the bearing base, and the working fluid sequentially passes toward the thrust disc through the bearing base, each of the plurality of elastic support portions and each of the plurality of bearing pads, and is discharged at a pressure to support the thrust disc.

9. The thrust bearing of claim 8, wherein the working fluid supply line includes:

a first supply line provided inside the bearing base;

a second supply line connected to the first supply line and provided inside each of the plurality elastic support portions; and a third supply line connected to the second supply line and provided inside each of the plurality of bearing pads.

10. The thrust bearing of claim 9, wherein the first supply line includes:

a bearing groove formed circumferentially on a rear surface of the bearing base; and a base flow channel part connected to the bearing groove and including a first flow channel extending toward the first elastic body and a second flow channel extending toward the second elastic body, wherein the first and second flow channels are connected to each of the plurality of elastic support portions.

11. The thrust bearing of claim 10, wherein the second supply line includes:

a third flow channel connected to the first flow channel and formed inside the first elastic body to have a shape corresponding to the first elastic body; and a fourth flow channel connected to the second flow channel and formed inside the second elastic body to have a shape corresponding to the second elastic body.

12. The thrust bearing of claim 9, wherein the third supply line includes:

a fifth flow channel connected to the second supply line and formed inside each of the plurality of bearing pads to have a shape traversing between inner and outer diameters of each of the plurality of bearing pads;

a sixth flow channel connected to the fifth flow channel and extending along the bearing surface of each of the plurality of bearing pads so as to form a grid structure symmetrical in a circumferential direction with respect to the fifth flow channel; and a plurality of orifices connected to the sixth flow channel, and formed from corners of the grid structure toward the bearing surface.

* * * * *